United States Patent [19]

Cathey, Jr. et al.

[11] Patent Number: 5,521,695

[45] Date of Patent: May 28, 1996

[54] RANGE ESTIMATION APPARATUS AND METHOD

[75] Inventors: Wade T. Cathey, Jr., Boulder; Edward R. Dowski, Jr., Lafayette, both of Colo.

[73] Assignee: The Regents of the University of Colorado, Boulder, Colo.

[21] Appl. No.: 83,829

[22] Filed: Jun. 25, 1993

[51] Int. Cl.⁶ .............................. H04N 7/18; G01C 3/08
[52] U.S. Cl. .................. 356/4.01; 250/201.2; 348/135; 364/458
[58] Field of Search .................. 356/4, 4.01; 364/458; 354/402; 250/201.2; 348/135

[56] References Cited

U.S. PATENT DOCUMENTS

| | | |
|---|---|---|
| 3,054,898 | 9/1962 | Westover et al. |
| 4,178,090 | 12/1979 | Marks et al. |
| 4,573,191 | 2/1986 | Kidode et al. |
| 4,794,550 | 12/1988 | Greivenkamp, Jr. |
| 4,825,263 | 4/1989 | Desjardins et al. |
| 4,843,631 | 6/1989 | Steinpichler et al. |
| 5,076,687 | 12/1991 | Adelson ........................ 356/4 |
| 5,102,223 | 4/1992 | Uesugi et al. |
| 5,193,124 | 3/1993 | Subbarao ........................ 354/400 |
| 5,243,351 | 9/1993 | Rafanelli et al. |
| 5,337,181 | 8/1994 | Kelly ........................ 359/574 |

OTHER PUBLICATIONS

Article Entitled "Conoscopic Holography. T. Basic Principles and Physical Basis" By G. Y. Sirat, J. OPT. SOC. AM.A/vol. 9, No. 1, Jan. 1992, pp. 70–83.

Primary Examiner—Stephen C. Buczinski
Attorney, Agent, or Firm—Francis A. Sirr; Earl C. Hancook; Jennifer L. Bales

[57] ABSTRACT

A range or distance estimating apparatus and method estimates the range to various points within a scene by imaging the scene through an optical mask and a lens onto a CCD, and then digitally processing the light intensity values stored in the CCD. The optical mask is designed such that the optical system transformation matrix is rank deficient for a particular set of object ranges. In this way, linear functions can be found to annihilate given sampled image data at a plurality of ranges, independent of the intensity of the light received from the object. A statistical detector is used to determine the closest associated range to the actual range of the point within the scene.

10 Claims, 6 Drawing Sheets
(2 of 6 Drawing Sheets in Color)

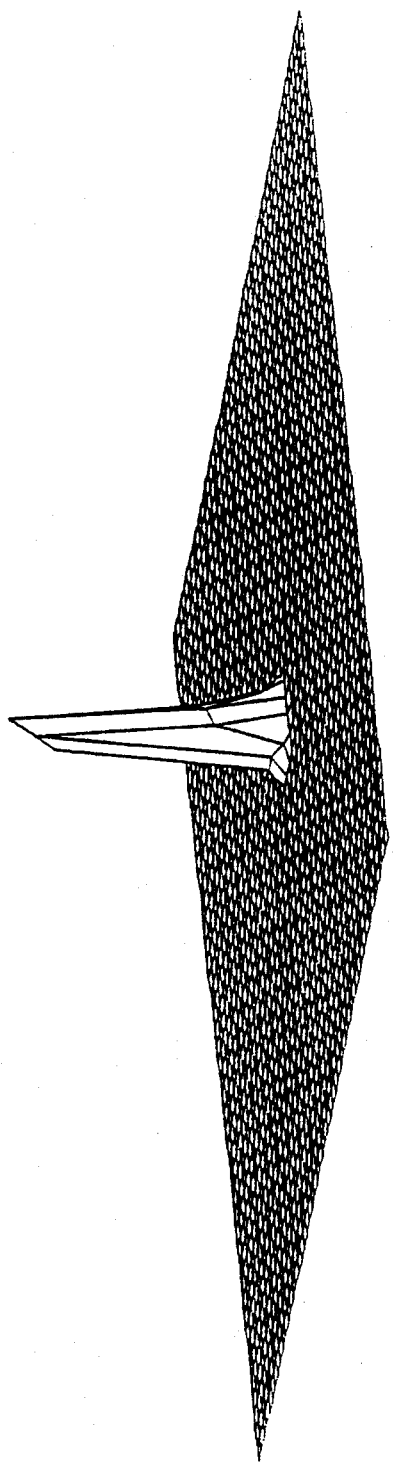
Figure 2B — In-Focus PSF
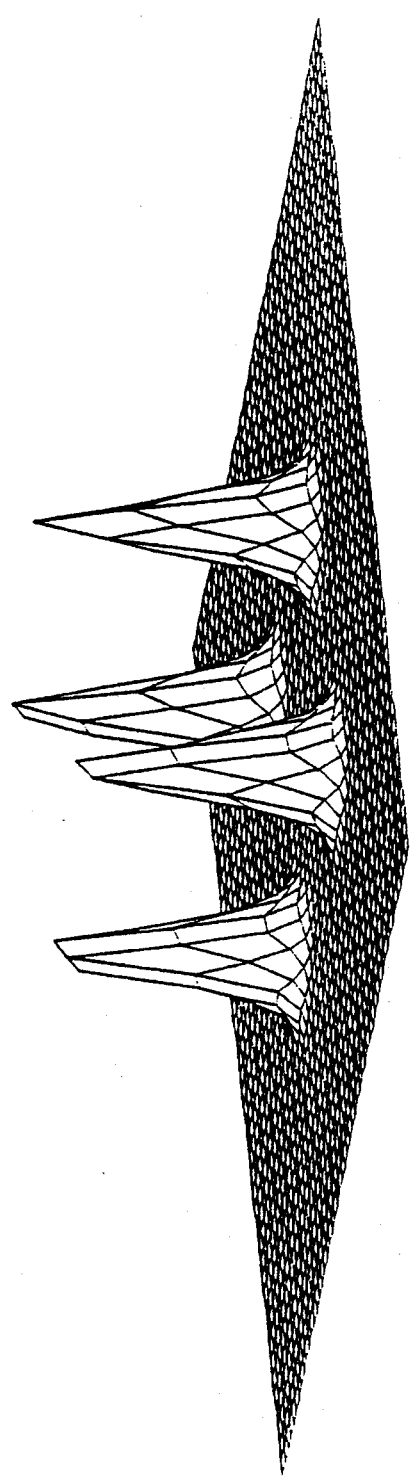
Figure 2C — Out of Focus PSF

RANGE ESTIMATION APPARATUS AND METHOD

BACKGROUND OF THE INVENTION

1. Field of the Invention

This invention relates to apparatus and methods for estimating the range or distance from a camera to various points in a three-dimensional scene being viewed by the camera. More particularly, this invention relates to range estimation utilizing a single camera system, an optical mask, and digital processing of the digital image data that is generated by the camera.

2. Description of the Prior Art

Prior inventions directed to estimating the range to various points in a scene, or to accomplishing related goals such as determining object contour or creating a three dimensional image of an object, commonly utilize two spaced apart views of an object, and then triangulate to determine range. Other two camera systems determine range by correlating the image shifting that is required to match the two images that are provided by two spaced apart cameras. Kidode et al., U.S. Pat. No. 4,573,191, is an example of such a system. Marks et al., U.S. Pat. No. 4,178,090, is a variation which uses an exterior means to split an image, then present the split image to a single camera, and then record both images on a common piece of film.

Devices which do not require the use of two object views, or two cameras, include Greivenkamp, Jr., U.S. Pat. No. 4,794,550, which discloses enhancement of Moire contouring past the Nyquist frequency limit by utilizing a prior knowledge about the surface of the object being viewed. Desjardins et al., U.S. Pat. No. 4,825,263, discloses a method for determining object contours by shining a grid of light on the object and photographing the resulting reflection. Image processing then detects grid intersection points, and thereby determines surface curvature of the object. Steinpichler et al., U.S. Pat. No. 4,843,631, discloses a method of pattern recognition utilizing a comparison of the Fourier transform of an image to reference patterns. Uesugi et al., U.S. Pat. No. 5,102,223, discloses illuminating an object with a moving slit beam and comparing the image thus generated with a reference image to measure object curvature.

"Conoscopic holography, 1. Basic principles and physical basis", *J. Opt. Soc. Am. A*/Vol 9, No. 1/January 1992, by Gabrial Y. Sirat discloses a system to estimate the range to an object by utilizing a pair of polarized crystals which produce an image which is a monotonic function of misfocus to the object. The system measures only one distance within the scene.

The need remains in the art for a passive single camera range estimation system that directly measures range to various points in a scene.

SUMMARY OF THE INVENTION

This invention relies upon a linear system concept of sub-space projection and null-space detection, to thereby form estimates of the distance from an observation location to object blocks.

An object of the present invention is to provide an apparatus and method for measuring the range to various points in a scene by using an optical mask placed before a single camera, and uses digital processing of the resulting digital image data that is provided by the camera.

Apparatus in accordance with the invention estimates the distance from an observation location to various points in a three-dimensional scene that contains a three-dimensional object. An optical mask at a conjugate plane of the imaging system is constructed and arranged to yield a singular (geometrically rank deficient), known, imaging system transformation matrix for a predetermined range, or spread, of object distances, thereby encoding object distance information into the intensity of light that is received from the object and passed through the mask. A lens receives distance-encoded light from the mask, and focuses this distance-encoded light onto a plane. A charge-coupled device at this plane digitally records the intensity of the distance-encoded light received from the lens. A digital image processor then extracts the distance information from the digitally recorded intensity of the distance-encoded light.

The optical mask means may comprise optical material having variations in opaqueness providing the rank deficient, known, imaging system transformation matrix. For example, a computer-generated image representing the necessary optical mask can be displayed on a high-resolution graphic device and photographically copied. This photographic film, after development, will be an optical mask that represents the non-negative real part of the computer generated image or mask. The mask may also comprise optical material having variations in thickness providing the rank deficient, known, imaging system transformation matrix, and may comprise optical material having variations in index of refraction providing the rank deficient, known, imaging system transformation matrix.

These and other objects and advantages of the invention will be apparent to those of skill in the art upon reference to the following detailed description of the invention, which description makes reference to the drawing.

BRIEF DESCRIPTION OF THE DRAWINGS

The file of this patent contains at least one drawing executed in color. Copies of this patent with color drawings will be provided by the Patent and Trademark Office upon request and payment of the necessary fee.

FIG. 2 shows the effect of a mask embodying a simple point spread function on a three dimensional object image. FIGS. 2B and 2C show the two-dimensional impulse response, or point spread function, of points at two distances.

DETAILED DESCRIPTION OF THE PREFERRED EMBODIMENTS

Figure 1:
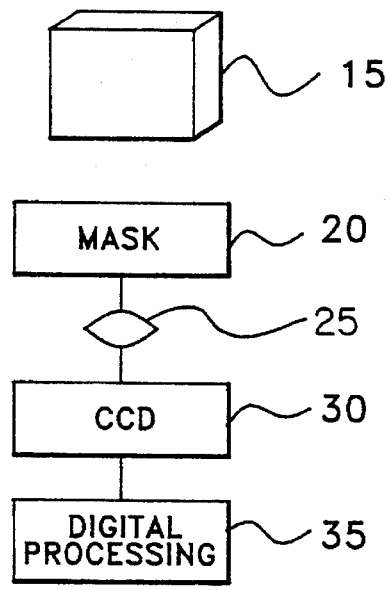
FIG. 1 is a block diagram of a preferred embodiment of the invention.

FIG. 1 discloses the interaction and operation of a multi-component range estimation system in accordance with the invention. The following description accurately describes the interaction of the system. Appendix A gives a complete mathematical description of the system.

Three-dimensional scene or object 15 is imaged through optical mask 20 and lens 25 onto Charge Coupled Device (CCD) system 30. Those skilled in the art will appreciate that any image recording and retrieval device equivalent to a CCD could be used in place of CCD system 30. Preferably, but without limitation thereto, object 15 is stationary with respect to lens 25 during the sampling interval of CCD system 30.

Without limitation thereto, mask 20 is composed of an optical material, such as plastic, having variations in opaqueness and/or thickness. Mask 20 is designed to yield a rank deficient, known, imaging system transformation matrix, or rectangular array of mathematical elements, for each of a predetermined spread of object ranges; i.e., distances from CCD system 30 to object 15.

To accomplish this end, a coherent impulse response can be chosen as a linear combination of damped exponentials. The parameters of these damped exponentials are determined by mathematical constraints and by optical system requirements. For a detailed description of how mask 20 is designed to meet particular system requirements, refer to Appendix A.

Figure 2E:
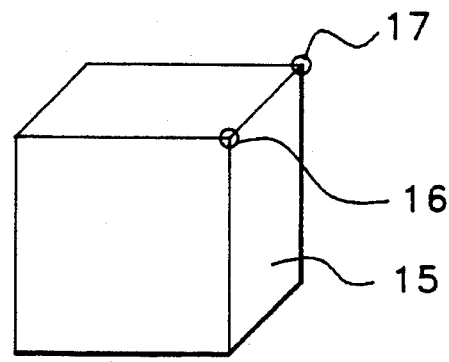
FIG. 2E shows a simple three-dimensional object.
Figure 2F:
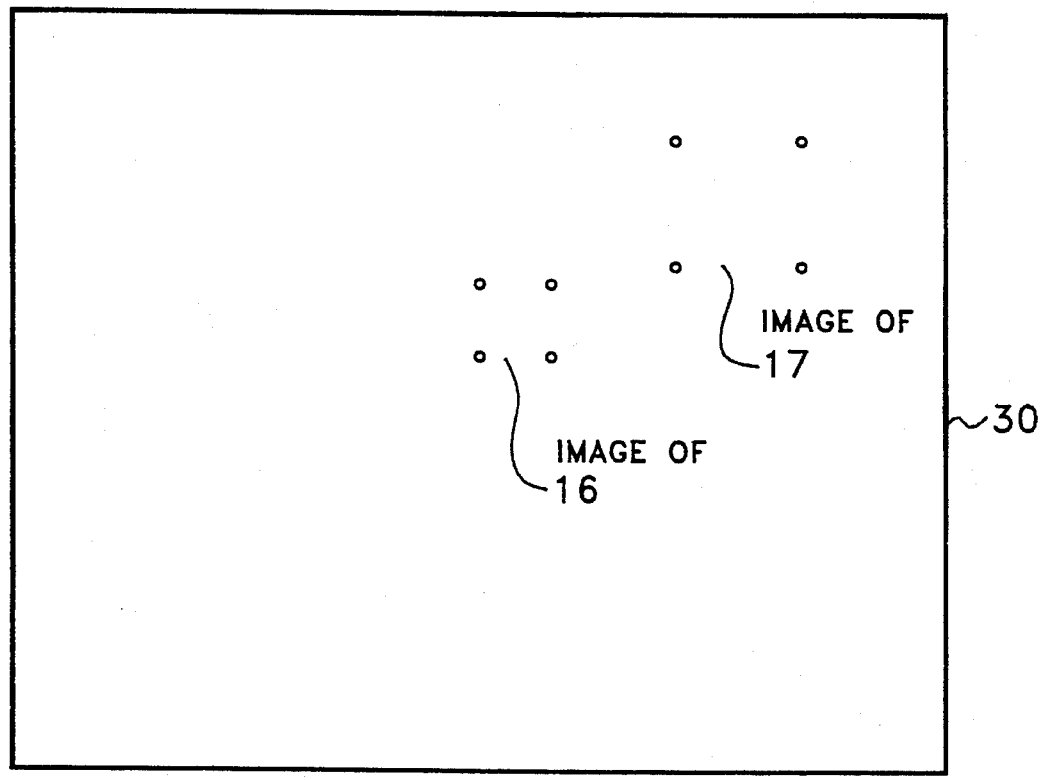
FIG. 2F shows the corresponding image on a CCD camera or similar image recording and retrieval device.
Figure 2A:
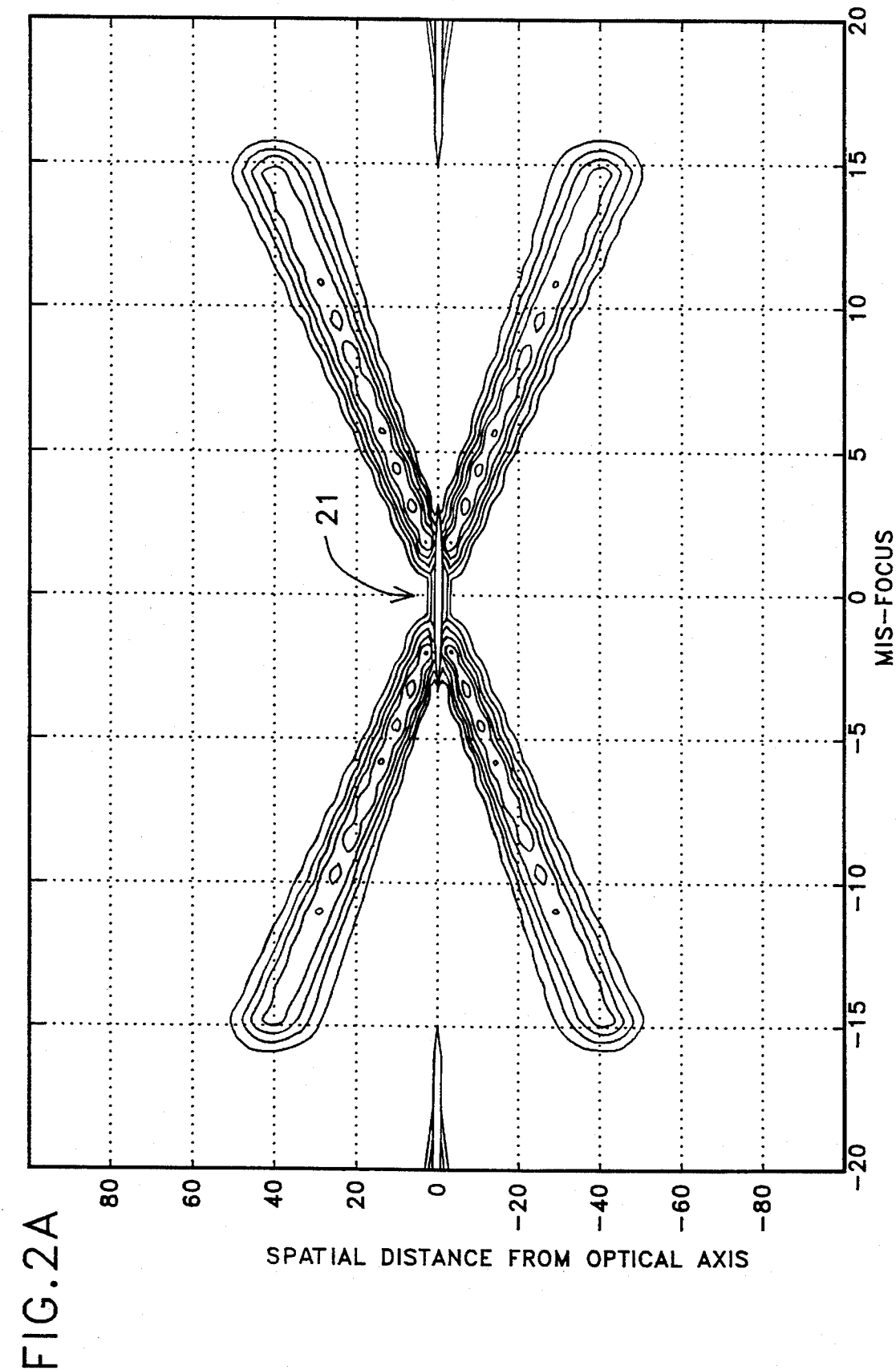
FIG. 2A shows the two-dimensional point spread function.
Figure 2D:
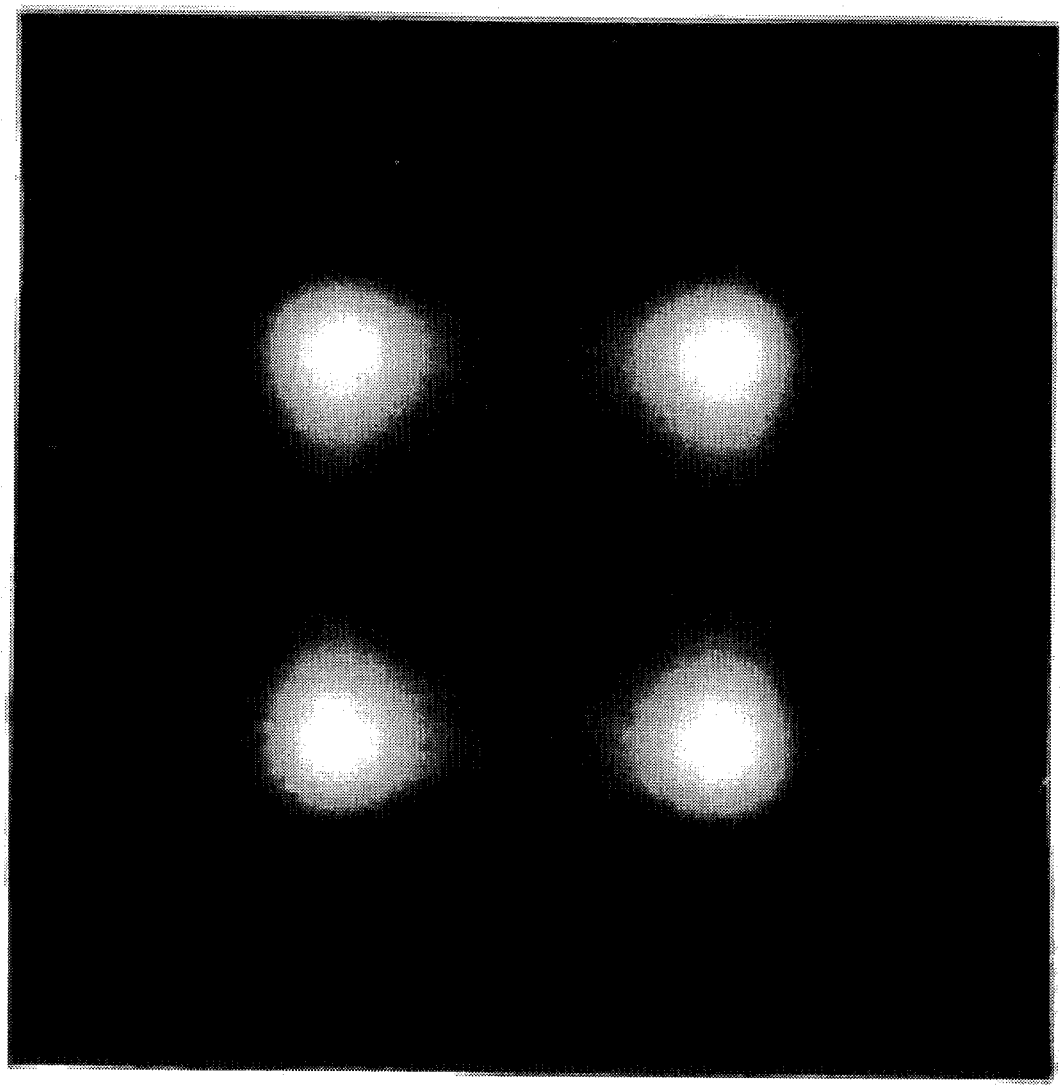
FIG. 2D shows the two-dimensional mask used to implement the point spread function of FIG. 2A.

One simple mask has a one-dimensional point spread function as shown in FIG. 2A. Thus, a point on object 15, or impulse of light at the distance designated 21 from CCD system 30, would produce a two-dimensional image like that shown in FIG. 2B, having a gaussian-like response. This image would resemble a dot of light. A point of light at a distance different from 21 would produce an image like FIG. 2C, looking approximately like four gaussian-like shapes. This FIG. 2C image would resemble four dots. The four peaks of light in FIG. 2C would be farther apart the farther the object point was from distance 21. Thus, object distance, as well as object intensity, is encoded in the signal recorded by CCD system 30. Typically, the system of FIG. 1 would be designed so that point 21 of FIG. 2A would be located outside of the object range (at the minimum focussing distance of lens 25, for example) so that only one distance will produce a given point separation on CCD system 30. Otherwise, range ambiguity could result. FIG. 2D shows the magnitude of a two-dimensional mask 20 that would be used to produce the one-dimensional point spread function shown in FIG. 2A.

FIG. 2E shows a typical three-dimensional object 15 with two points 16 and 17 at different distances from mask 20. FIG. 2F shows how each of the points 16 and 17 would be recorded on CCD 30, given the mask point spread function shown in FIG. 2A, and setting the range corresponding to point 21 somewhere between the mask and the closest point of object 15. Point 16, which is closer to point 21, would produce an image that is similar to four dots close together, and point 17, further from point 21, would produce a similar image with the four dots further apart.

Figure 3A:
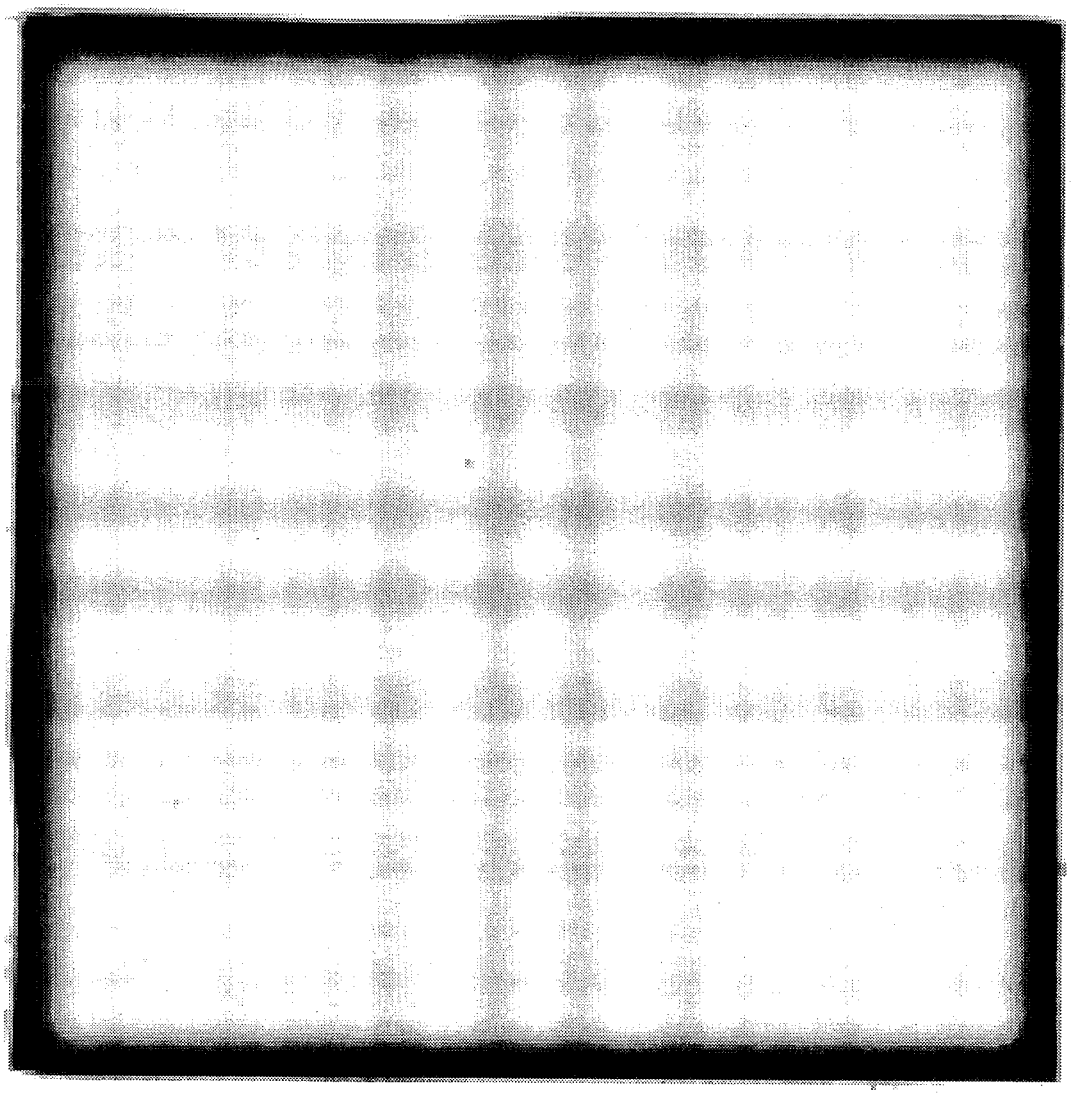
FIG. 3A is the magnitude of the two-dimensional mask implementing the one-dimensional point spread function shown in FIG. 3B.
Figure 3B:
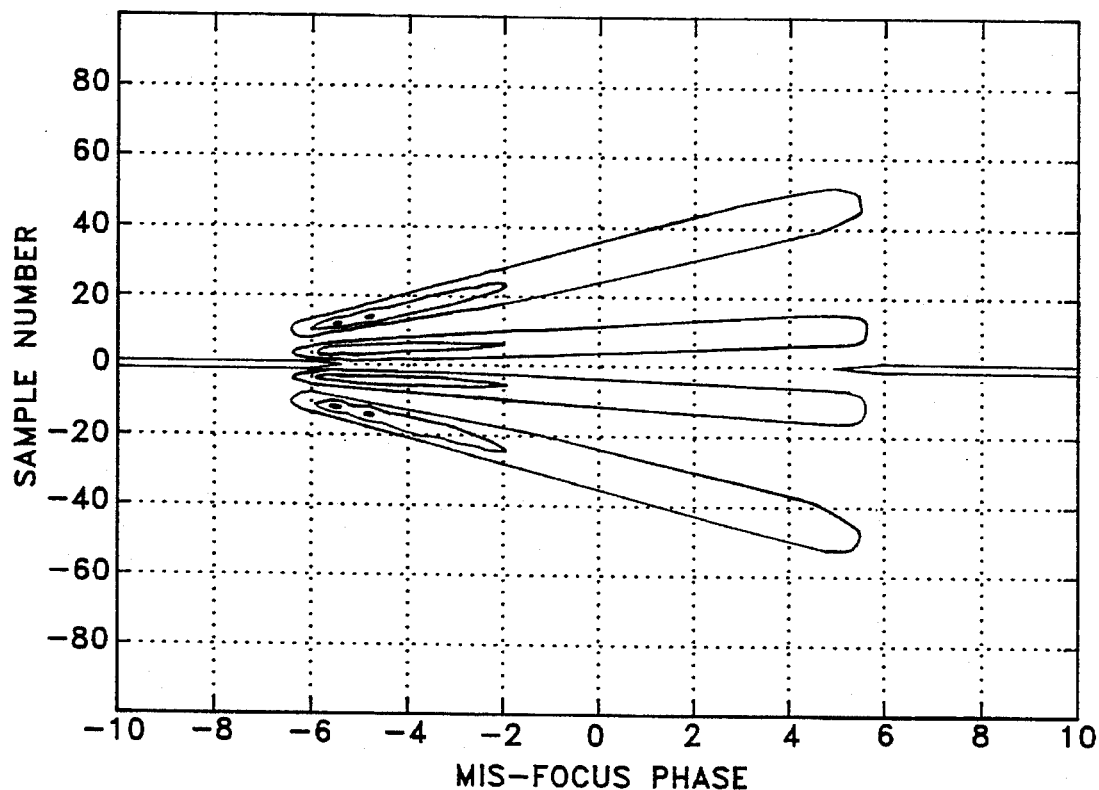
FIG. 3 shows a more complicated point spread function and the magnitude of its associated mask.

The mask 20 shown in FIG. 2D is conceptually easy to understand, but is optically inefficient, in that very little light gets through the mask. Those skilled in the art will understand that many types of mask will satisfy the needed mathematical matrix constraints, as long as they produce a rank deficient, known, image transformation matrix for each expected object range. The magnitude of one very efficient mask is shown in FIG. 3A. Its corresponding one-dimensional point spread function as a function of mis-focus is shown in FIG. 3B.

CCD system 30 measures and records the light intensity that is received from mask 20. CCD systems, such as 30, are conventional and are currently available from a number of commercial sources. Alternatively, CCD system 30 may comprise a general purpose video camera that views and provides a digital image of stationary object 15, as object 15 is viewed through lens 25 and mask 20.

The light intensity values of small blocks of the image of object 15 (for example, 50 pixels by 50 pixels), as recorded by CCD 30, are digitally processed to yield a range, or distance estimate, for the corresponding small section or block of the object 15. Alternatively, it is possible to process overlapping blocks of image pixels to achieve range estimates that are closer together. Processing of the entire digital image of object 15; i.e., the entire output of CCD system 30 yields information which can be combined to form a three-dimensional range contour of object 15.

Figure 4:
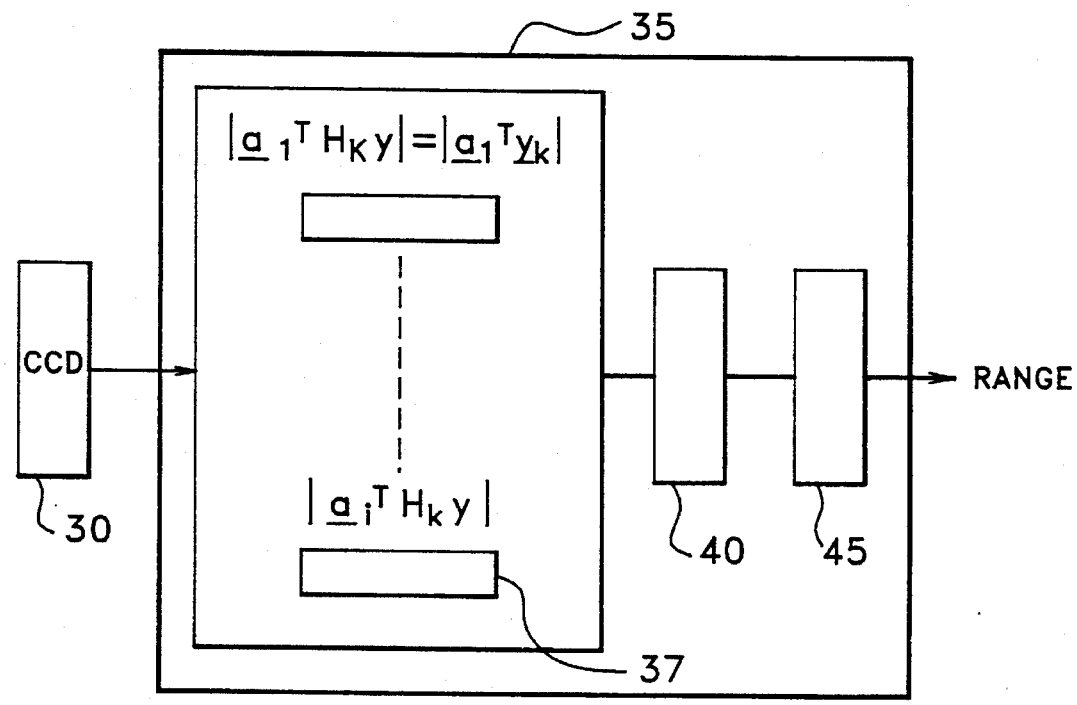
FIG. 4 is a block diagram of the digital processing apparatus shown in FIG. 1.

FIG. 4 is a block diagram of the digital image processing apparatus 35 of FIG. 1. The mathematics of the digital processing are described in Appendix A. It is accurate to consider the model for image formation as:

$$y_i = H_i u$$

where:

i = the index corresponding to the range to the object $y_i$ = a small block of pixel data arranged in a vector format within CCD 30

$H_i$ = the imaging system transformation matrix composed of the point spread function of mask 20 for points at the distance of u u = the corresponding intensity vector of object 15 which forms the image vector yi $$H_i = \begin{vmatrix} \underline{h}_{L-1} & \underline{h}_{L-2} & \ldots & \underline{h}_1 \cdot \underline{h}_0 & \ldots & 0 \\ 0 & \underline{h}_{L-1} & \ldots & \underline{h}_1 \cdot \underline{h}_0 & \ldots & 0 \\ \cdot & & & \cdot & & \\ \cdot & & & \cdot & & \\ \cdot & & & & & \\ 0 & \ldots & \underline{h}_{L-1} & \ldots & \underline{h}_1 \cdot \underline{h}_0 & \end{vmatrix} \text{ where } \underline{h} = \begin{vmatrix} h_0 \\ h_1 \\ \cdot \\ \cdot \\ \cdot \\ h_{L-1} \end{vmatrix}$$

h is the length L sampled incoherent impulse response for points at the distance of object block u.

Then finding a vector $a_i^T$ such that $|a_i^T y_i|^2 = 0$, and $|a_i^T y_j|^2 = \backslash 0$ unless i=j, then $|a_i^T H_i u|^2 = 0$ also.

Where $|.|^2$ is the magnitude squared function and $(.)^T$ denotes vector transpose.

Since $H_i$ is associated with the range of the object block, the particular vector $a_i^T$, which when multiplied by $H_i$, gives a zero result, or a result closest to zero, is associated with a particular range. It can be said that vector $a_i$ annihilates the sampled image vector $y_i$ formed with $H_i$ independently of the intensity of object block u, being dependent only on the range to the object block u. Each $a_i^T$ is stored in a digital computer, for example, and tried in turn. The set of multiplication values obtained is stored as shown in block 37.

Of course, only particular known ranges actually produce a value of zero for any $a_i^T$ (within the limits of system noise), but by using statistical detector 40, the lowest power value is determined. In the preferred embodiment, statistical detector 40 is a maximum likelihood detector because it is statistically efficient detector. Those skilled in the art will appreciate that a variety of detection/estimation algorithms may be used to detect range, all using the same null space characteristics of the optical mask. Look up table 45 correlates the $a_i^T$, associated with the lowest power value found, to the approximate range of the object's sample block. If the lowest power value is zero, than the range is exact (within system noise limits).

Digital processing in FIG. 4 is done on each block of light received from lens 25, and stored in CCD system 30 until a contour of the entire image of object 15 is constructed, thus effectively forming a three dimensional range contour of object 15. This range contour can be combined with the conventional image of the object to form a three-dimensional image.

While the forgoing description has been made independent of color, it will be understood that in a three color system (red, blue, green), each of the colors is affected by misfocus differently than the others. With a color camera, any object at a certain range will form three images, one in each of the three primary colors. A slight modification to the formation of the mask and the digital processor will enable the invention to operate equally well with a three color camera. Appendix B gives a mathematical description of this process, and those skilled in the art will understand the required modifications to the digital processing system (shown in FIG. 4) necessary to affect this process.

This description has focussed on optical frequencies, but those skilled in the art will appreciate that this concept could easily be extended to radar frequencies, thermal imaging, or even sonar. To implement a radar frequency system, for example, a series of antennas would replace the lens.

The invention has been described with reference to preferred embodiments thereof. However, it is apparent that those skilled in the art will readily visualize other embodiments of the invention that are within the scope and spirit of the invention. Thus, it is intended that the invention be limited only by the following claims.

The file of this patent contains appendices.

What is claimed is:

1. Apparatus for estimating the distance from an observation location to various points in a three-dimensional scene that contains a three-dimensional object, comprising:

optical mask means at said observation location constructed and arranged to yield a rank deficient, known, imaging system transformation matrix for a predetermined spread of object distances, thereby encoding object distance information onto the intensity field of light passing through said mask means, image recording and retrieval device means for digitally recording the intensity of said distance encoded light, and digital processing means for extracting said distance information from said digitally recorded intensity of said distance encoded light.

2. The apparatus of claim 1 wherein said optical mask means comprises optical material having variations in opaqueness providing said rank deficient, known, imaging system transformation matrices for said predetermined spread of object distances.

3. The apparatus of claim 2 wherein said mask means is formed by imaging a high resolution visual display corresponding to said rank deficient, known, imaging system transformation matrices onto photographic film, said film when developed forming said mask means.

4. The apparatus of claim 1 wherein said optical mask means comprises optical material having variations in thickness providing said rank deficient, known, imaging system transformation matrices for said predetermined spread of object distances.

5. The apparatus of claim 1 wherein said optical mask means comprises optical material having variations in index of refraction providing said rank deficient, known, imaging system transformation matrices for said predetermined spread of object distances.

6. A system for estimating the distance to various points in a three-dimensional scene, comprising;

mask means constructed and arranged to yield a rank deficient, known, imaging system transformation matrix for a predetermined spread of scene distances, thereby encoding distance information into the intensity of the light passing through said mask means, and distance detecting means responsive to said encoded distance information.

7. A method for estimating the distance to various points in a three-dimensional scene that contains a three-dimensional object, comprising the steps of:

A) passing light from the scene through an optical mask constructed and arranged to yield a rank deficient, known, imaging system transformation matrix for a predetermined spread of object distances, thereby encoding distance information into the intensity of the light passing through said mask, B) recording the intensity of the light received through said mask onto an image recording and retrieval device, and C) processing said recorded intensity of light to extract said distance information therefrom.

8. The method of claim 7 wherein step C comprises the steps of:

C1) extracting said imaging system transformation matrix for a small block of scene pixels stored in said image recording and retrieval device, C2) storing a set of vectors associated with various known distances such that multiplying one of said stored vectors by a given imaging system transformation matrix produces a multiplication value of zero if, and only if, said given imaging system transformation matrix was produced by a point in the object at a distance that is associated with said one of said stored vectors, C3) multiplying said extracted imaging system transformation matrix by each of said stored vectors and storing a set of multiplication values produced thereby, C4) utilizing a statistical detector to select a multiplication value from said set that is equal to or closest to zero, C5) assigning a distance value associated with the vector that produced said selected multiplication value equal to, or closest to, zero to the portion of the scene which produced said small block of scene pixels, and C6) repeating above steps C1 through C5 for each small block of scene pixels stored in said image recording and retrieval device.

9. The method of claim 8 wherein step C4 utilizes a maximum likelihood detector as said statistical detector.

10. The method of claim 8 wherein step C6 repeats said method steps C1 through C5 for overlapping blocks of scene pixels stored in said image recording and retrieval device.

\* \* \* \* \*